United States Patent
Katayama

(10) Patent No.: US 8,531,283 B2
(45) Date of Patent: Sep. 10, 2013

(54) CONTROL METHOD FOR SWITCHING BETWEEN SCALES IN VEHICULAR INSTRUMENT, AND VEHICULAR INSTRUMENT

(75) Inventor: Yasushi Katayama, Shimada (JP)

(73) Assignee: Yazaki Corporation, Tokyo (JP)

( * ) Notice: Subject to any disclaimer, the term of this patent is extended or adjusted under 35 U.S.C. 154(b) by 360 days.

(21) Appl. No.: 12/990,559

(22) PCT Filed: Dec. 8, 2009

(86) PCT No.: PCT/JP2009/070560
§ 371 (c)(1),
(2), (4) Date: Nov. 1, 2010

(87) PCT Pub. No.: WO2010/067804
PCT Pub. Date: Jun. 17, 2010

(65) Prior Publication Data
US 2011/0043347 A1 Feb. 24, 2011

(30) Foreign Application Priority Data
Dec. 9, 2008 (JP) ................... 2008-313282

(51) Int. Cl.
*B60Q 1/00* (2006.01)
(52) U.S. Cl.
USPC ............. 340/438; 340/525; 340/815.75
(58) Field of Classification Search
USPC ............. 340/438–439, 488, 525, 815.75, 340/815.56, 815.78, 815.66, 815.45, 815.87
See application file for complete search history.

(56) References Cited

U.S. PATENT DOCUMENTS

| | | | |
|---|---|---|---|
| 7,107,130 B2 * | 9/2006 | Kondo et al. | 701/1 |
| 7,703,410 B2 * | 4/2010 | Fukuda et al. | 116/282 |
| 7,928,859 B1 * | 4/2011 | Li et al. | 340/815.78 |
| 2006/0077068 A1 * | 4/2006 | Harada et al. | 340/815.86 |
| 2006/0232986 A1 * | 10/2006 | Miyagaki et al. | 362/459 |
| 2007/0040072 A1 * | 2/2007 | Kageyama et al. | 248/27.1 |
| 2007/0186843 A1 * | 8/2007 | Tsurumi | 116/286 |

FOREIGN PATENT DOCUMENTS

| | | |
|---|---|---|
| JP | 60-097217 A | 5/1985 |
| JP | 1-096559 A | 4/1989 |
| JP | 2001-066167 A | 3/2001 |
| JP | 2001-66167 A | 3/2001 |
| JP | 2006-220482 A | 8/2006 |
| JP | 2007-093391 A | 4/2007 |

OTHER PUBLICATIONS

International Search Report [PCT/ISA/210] issued Mar. 9, 2010, in International Application No. PCT/JP/2009/070560.
Office Action dated Feb. 26, 2013 issued by the Japanese Patent and Trademark Office in counterpart Japanese Application No. 2008-313282.

* cited by examiner

*Primary Examiner* — Daniel Previl
(74) *Attorney, Agent, or Firm* — Sughrue Mion, PLLC

(57) ABSTRACT

A purpose of the invention is to provide a control method for switching between scales in the vehicular instrument that can prevent erroneous recognition and perform highly safety displaying. When a vehicle information display of a scale A is changed to a vehicle information display of a scale B, emission of light for displaying a scale associated with the vehicle information display of the scale A is temporarily stopped, and after that, emission of light for displaying a scale associated with the vehicle information display of the scale B is started.

3 Claims, 10 Drawing Sheets

FIG. 4
(a) 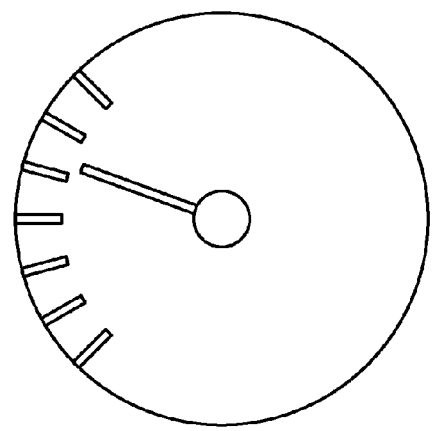
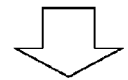
(b) 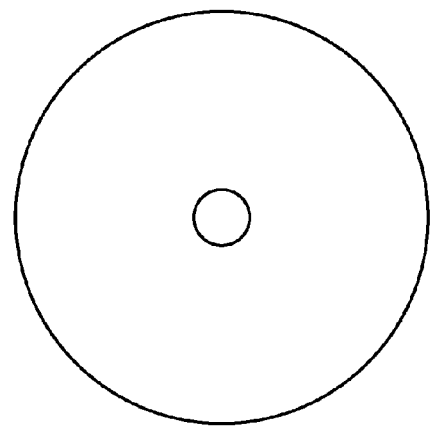
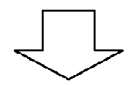
(c) 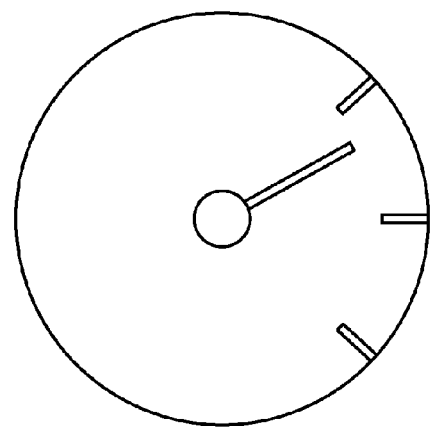

FIG. 5
(a) 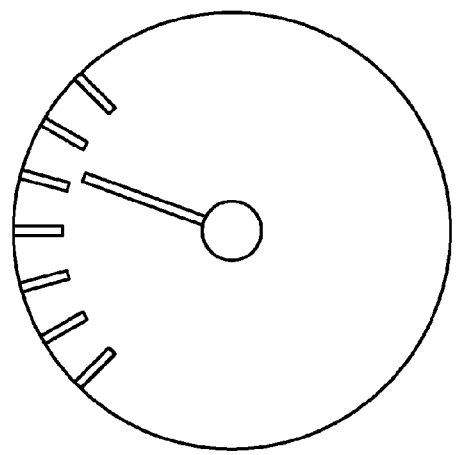
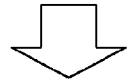
(b) 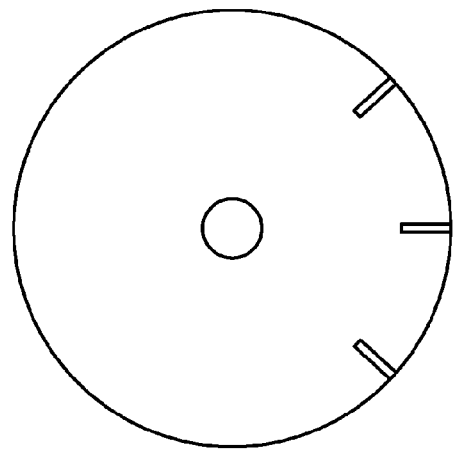
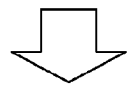
(c) 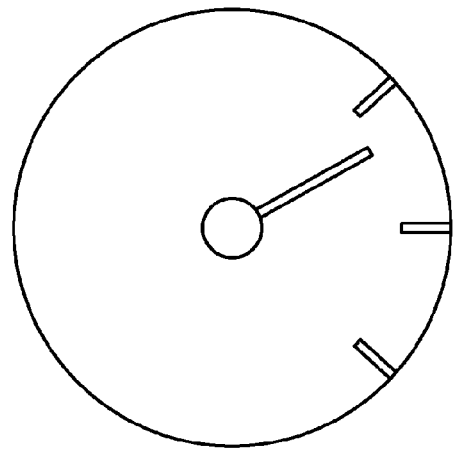

FIG. 6
(a) 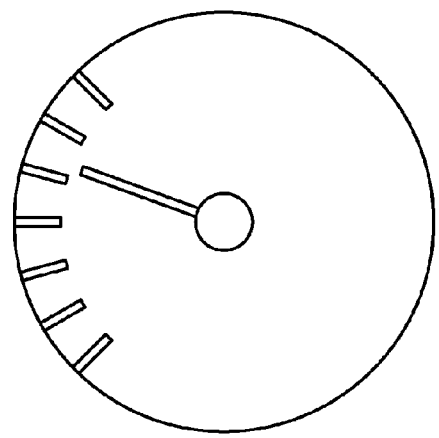
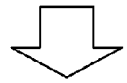
(b) 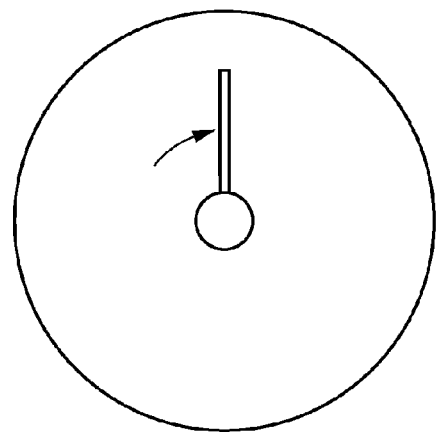
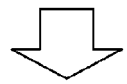
(c) 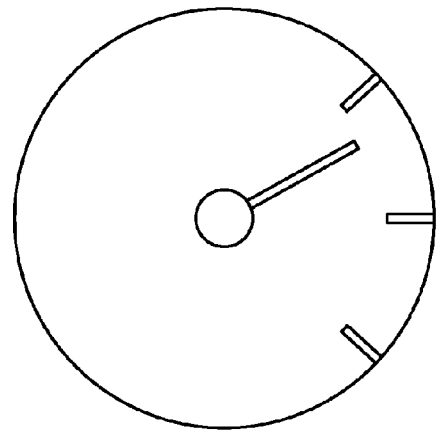

FIG. 10
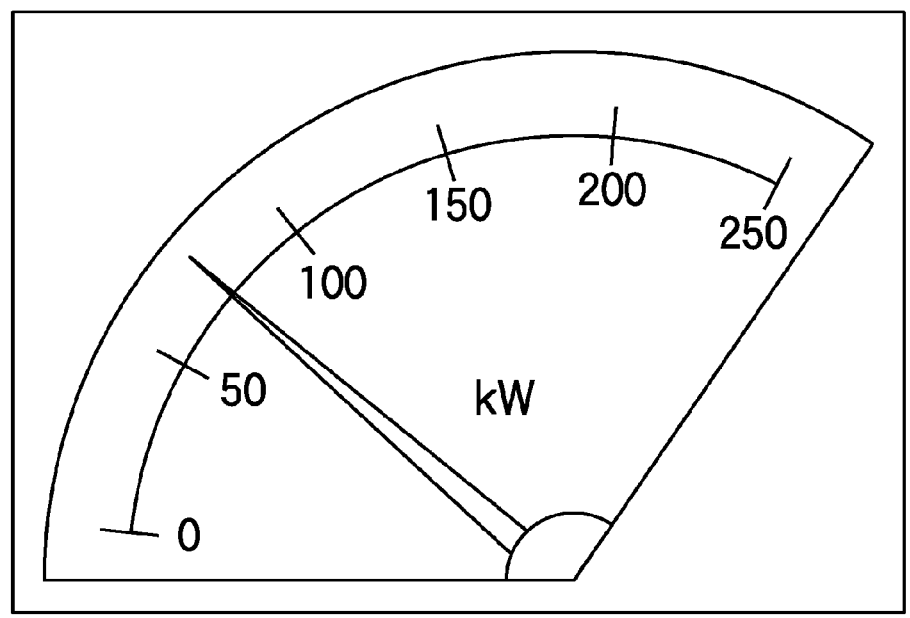
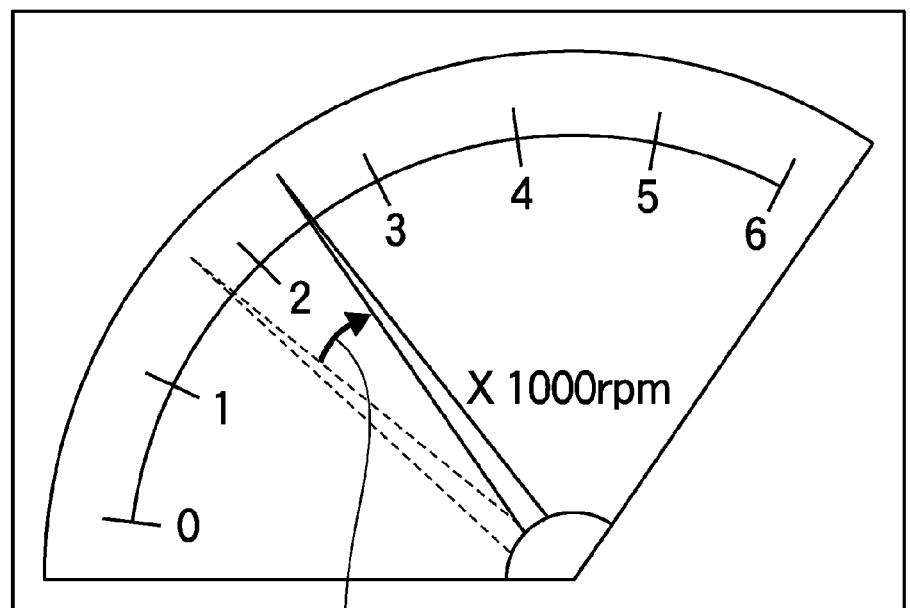
(a)

CONTROL METHOD FOR SWITCHING BETWEEN SCALES IN VEHICULAR INSTRUMENT, AND VEHICULAR INSTRUMENT

TECHNICAL FIELD

The present invention relates to a control method for switching between scales in a vehicular instrument for indicating values of parameters associated with a plurality of pieces of vehicle information by using an identical pointer.

BACKGROUND ART

In analogue vehicular instruments mounted in vehicles such as an automobile or the like, there are a speed meter for indicating a speed, a tachometer for indicating a rotational speed of an engine and the like. Heretofore, a vehicular instrument in which a plurality of scales are displayed on an identical display plate and each of values of parameters associated with a plurality of pieces of information is indicated by an identical pointer, has been provided (see, for example, patent document 1). In addition, by utilizing the above case, a vehicular instrument in which two displays arranged on a dial can be interchanged between right and left positions, has been also provided (see, for example, patent document 2).

PRIOR ART DOCUMENTS

Patent Documents

Patent Document 1: JP-A-2006-220482 (Pages 5 to 12, FIG. 7)
Patent Document 2: JP-A-2007-93391 (Pages 3 to 9, FIG. 6)

SUMMARY OF INVENTION

Problems that the Invention is to Solve

However, in the above vehicular instruments, as shown in FIG. 10, for example, when the display is switched from a scale A that indicates an output of an engine to a scale B that indicates a rotational speed of the engine, the vehicular instrument indicates a value different from an actual vehicle information value during a time period from just after switching to the scale B until a pointer is moved to an adequate indication value on the scale B, thus resulting in a problem. Particularly, in a case where a rotational angle (an angle designated by (a) in FIG. 10) for moving is large, a driver may visually observe the dial during the above time period with high possibility so that the driver may erroneously recognize the information.

In view of the above problems, a purpose of the invention is to provide a control method for switching between scales in a vehicular instrument, capable of preventing erroneous recognition and performing highly safety displaying, by switching between scales after temporarily turning off the illumination of the scale and a pointer in the vehicle instrument when switching between the scales.

Means for solving the Problems

In order to achieve the purpose, a control method for switching between scales in a vehicular instrument according to the invention is characterized by the following items (1) through (7).

(1) A control method for switching between scales in a vehicular instrument that includes a dial which has a display section capable of displaying a plurality of scales at a front face side thereof, a light source which controls the display section to emit light for displaying, a pointer which turns to indicate a value associated with an arbitrary scale on the display section, and a light source which controls the pointer to emit light for displaying, the vehicular instrument switching emission of light for displaying between the plurality of the scales respectively and rotating the pointer for indication, thereby displaying a plurality of pieces of vehicle information on the identical display section. The control method includes:

a light emission stopping step of stopping emission of light for displaying a scale associated with a first vehicle information display when a display on the dial is changed from the first vehicle information display to a second vehicle information display; and a light emission starting step of starting emission of light for displaying a scale associated with the second vehicle information display.

(2) In the control method for switching between the scales in the vehicular instrument having the structure described in the item (1), illumination of the pointer is also turned off in the light emission stopping step. Illumination of the scale associated with the second vehicle information display and illumination of the pointer which is rotated to a predetermined position corresponding to the scale associated with the second vehicle information display are simultaneously turned on after a predetermined time period has elapsed from the turning-off of the illuminations of the scale and the pointer associated with the first vehicle information display in the light emission starting step.

(3) In the control method for switching between scales in the vehicular instrument having the structure described in the item (1), illumination of the pointer is also turned off in the light emission stopping step. Illumination of the scale associated with the second vehicle information display is turned on in the light emission starting step at the same time when the illuminations of the scale and the pointer associated with the first vehicle information display are turned off, and the illumination of the pointer that is rotated to a predetermined position corresponding to the scale associated with the second vehicle information display, is turned on after a predetermined time period has elapsed.

(4) In the control method for switching between scales in the vehicular instrument having the structure described in the item (1), in the light emission starting step, the pointer is rotated toward a predetermined position corresponding to the scale associated with the second vehicle information display at the same when the illumination of the scale associated with the first vehicle information display is turned off, and the light emission starting step is started after a predetermined time period has elapsed from the turning-off of the illumination of the scale associated with the first vehicle information display.

(5) In the control method for switching between the scales in the vehicular instrument having the structure described in the item (1), the illumination of the pointer associated with the first vehicle information display is turned off before the light emission stopping step, subsequently, the illuminance of the scale associated with the first vehicle information display is gradually decreased, thereby turning off the illumination of the scale associated with the first vehicle information display. Illuminance of the scale associated with the second vehicle information display is gradually increased, thereby turning on the illumination of the scale associated with the second vehicle information display in the light emission starting step, and subsequently, illumination of the needle which is rotated to a predetermined position corresponding to the scale associated with the second vehicle information display is turned on.

(6) In the control method for switching between scales in the vehicular instrument having the structure described in the item (1), illumination of the pointer is also turned off in the light emission stopping step. Illumination of the scale associated with the second vehicle information display is turned on, gradually increased and gradually decreased, or blinked repeatedly in the light emission starting step at the same time when the illumination of the scale and the pointer associated with the first vehicle information display are turned off, and subsequently, illumination of the pointer that is rotated to a predetermined position corresponding to the scale associated with the second vehicle information display, is turned on after a predetermined time period has elapsed.

(7) In the control method for switching between scales in the vehicular instrument having the structure described in the item (1), in the light emission starting step, the pointer is rotated toward a predetermined position corresponding to the scale associated with the second vehicle information display while gradually increasing and gradually decreasing of illuminance of the pointer or blinking of the illumination of the pointer is repeated at the same time when the illumination of the scale associated with the first vehicle information display is turned off, and further, after a predetermined time period has elapsed from the turning-off of the illumination of the scale associated with the first vehicle information display, the illumination of the pointer and the illumination of the scale associated with the second vehicle information display are turned on in the light emission starting step.

In accordance with the control method for switching between the scales in the vehicular instrument having the structure described in the item (1), since emission of light of a current scale is temporarily stopped when the display is changed to a display associated with another vehicle information, it is possible to prevent erroneous recognition in the event of switching and to provide accurate vehicle information.

In accordance with the control method for switching between the scales in the vehicular instrument having the structure described in the item (2), since illumination of a new display is turned on after the predetermined time period has elapsed from when illumination of a current display is turned off, it is possible to prevent erroneous recognition in the event of switching so as to provide accurate vehicle information.

In accordance with the control method for switching between the scales in the vehicular instrument having the structure described in the item (3), since illumination of a new scale is turned on just after illumination of a current display is turned off, and further illumination of the pointer that is rotated to an adequate position, is turned on after a predetermined time period has elapsed, it is possible to prevent erroneous recognition in the event of switching so as to provide accurate vehicle information.

In accordance with the control method for switching between the scales in the vehicular instrument having the structure described in the item (4), since the pointer that is in the illumination on state, is rotated to an adequate position on a new scale just after illumination of a display of a current scale is turned off and illumination of a new scale is turned on after the predetermined time period has elapsed from the turning-off of the illumination, it is possible to prevent erroneous recognition in the event of switching so as to provide accurate vehicle information.

In accordance with the control method for switching between the scales in the vehicular instrument having the structure described in the item (5), in addition to the prevention of erroneous recognition in the event of switching and provision of the accurate vehicle information, it is possible to achieve enhancing of the representation property of the displaying in the vehicular instrument and reduction of an uncomfortable feeling due to a waiting time by gradually changing the display of the scale.

In accordance with the control method for switching between the scales in the vehicular instrument having the structure described in the item (6), in addition to the prevention of erroneous recognition in the event of switching and provision of the accurate vehicle information, it is possible to achieve drawing of a driver's attention by, for example, blinking the display of the scale associated with a new display so as to generate an alarm.

In accordance with the control method for switching between the scales in the vehicular instrument having the structure described in the item (7), in addition to the prevention of erroneous recognition in the event of switching and provision of the accurate vehicle information, it is possible to achieve drawing of a driver's attention by, for example, blinking the display of the pointer that is in a state of rotation on a scale associated with a new display so as to generate an alarm.

In order to achieve the purpose, a vehicular instrument according to the invention is characterized by the following item (8).

(8) A vehicular instrument includes:

a dial that has a display section capable of displaying a plurality of scales at a front face side thereof;

a light source that controls the display section to emit light for displaying;

a pointer that turns to indicate a value associated with an arbitrary scale on the display section; and a light source that controls the pointer to emit light for displaying, wherein the vehicular instrument switches an emission of light for displaying between the plurality of the scales respectively and rotates the pointer for indicating, thereby displaying a plurality of pieces of vehicle information on the identical display section; and wherein when a display on the dial is changed from a first vehicle information display to a second vehicle information display, emission of light for displaying a scale associated with the first vehicle information display is stopped, and after that, emission of light for displaying a scale associated with the second vehicle information display is started.

In accordance with the vehicular instrument having the structure described in the item (8), since the emission of light for displaying of a current scale is temporarily stopped when the display is changed to a display associated with another vehicle information, it is possible to prevent erroneous recognition in the event of switching so as to provide accurate vehicle information.

Advantage of the Invention

In accordance with the invention, even when a plurality of pieces of vehicle information are displayed on the identical dial, it is possible to prevent erroneous recognition and to perform highly safety displaying.

Thus, the invention is briefly described. Further, by reading through the descriptions of embodiments for carrying out the invention by referring to the accompanying drawings, the detail of the invention can be more clearly understood.

BRIEF DESCRIPTION OF THE DRAWINGS

FIG. 4 is a typical view explanatorily showing procedures of an illumination-off process of a scale A and an illumination-on process of a scale B (example 1).

FIG. 5 is a typical view explanatorily showing procedures of an illumination-off process of a scale A and an illumination-on process of a scale B (example 2).

FIG. 6 is a typical view explanatorily showing procedures of an illumination-off process of a scale A and an illumination-on process of a scale B (example 3).

FIG. 10 is a typical view explanatorily showing a prior procedure of switching between scales in a vehicular instrument.

MODE FOR CARRYING OUT THE INVENTION

Preferred embodiments of the invention will be described with reference to the accompanying drawings.

Figure 1:
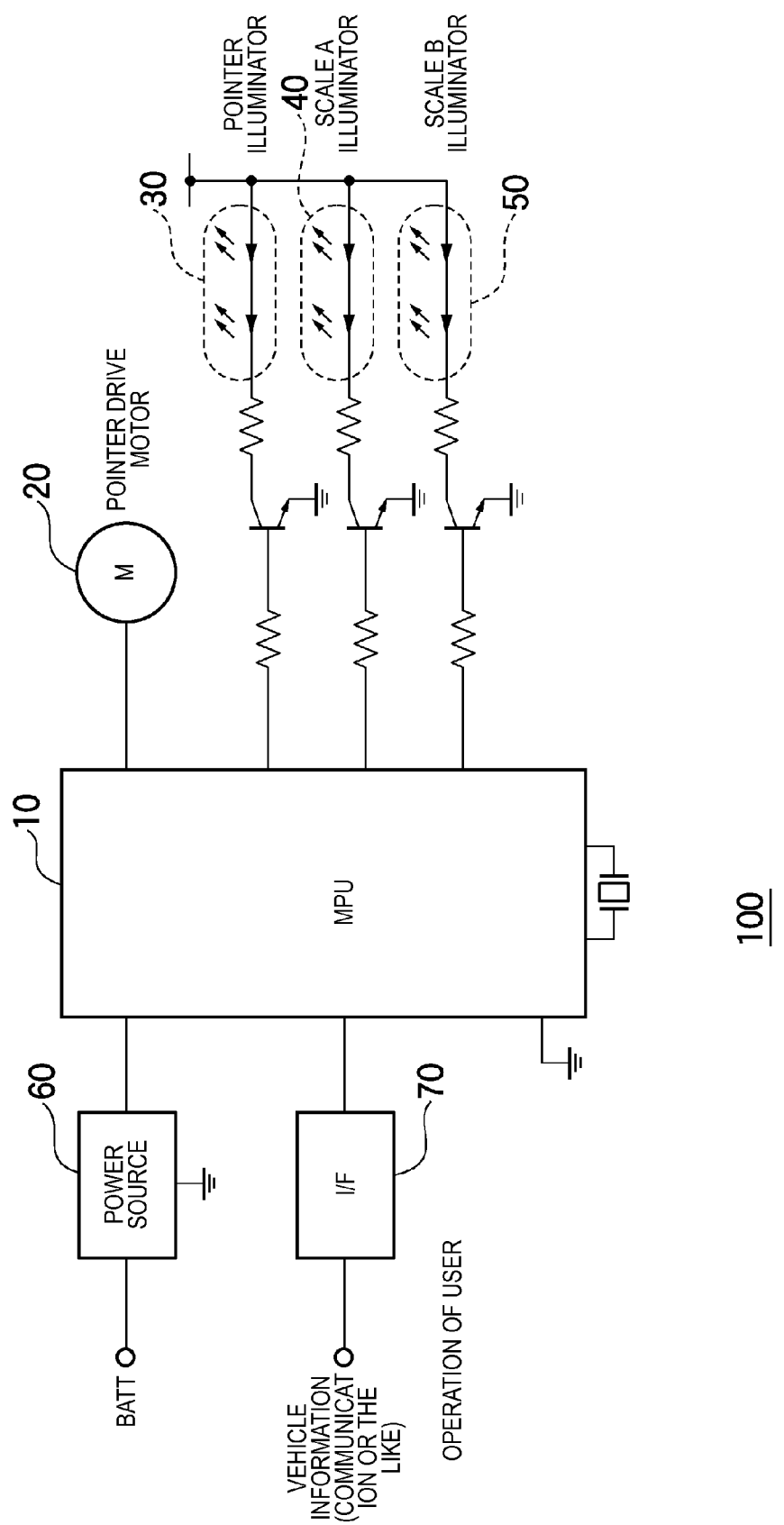
FIG. 1 is a block diagram showing a brief structure of a vehicular instrument according to an embodiment of the invention.

FIG. 1 is a block diagram showing a brief structure of a vehicular instrument according to an embodiment of the invention. A vehicular instrument 100 mainly includes an MPU 10, a pointer drive motor 20, a pointer illuminator 30, a scale A illuminator 40, a scale B illuminator 50, a power source 60, an input interface 70 and the like.

The MPU (Micro Processing Unit) 10 is a control unit that controls entire operations of the vehicular instrument. A method for switching between scales described later is achieved in such a manner that a program stored in the MPU 10 is executed. The pointer drive motor 20 rotates the pointer coupled to an end portion of a rotary shaft of the motor based on a rotation control command output from the MPU 10 so as to cause the pointer to indicate a predetermined position on an arbitrary scale. The pointer illuminator 30 is formed of a light emitting member such as an LED (a Light Emitting Diode) or the like so as to cause the pointer itself to emit light. The pointer is constituted such that the pointer is visible only when pointer emits light. In addition, similarly to the above, the scale A illuminator 40 is formed of a light emitting member such as an LED or the like so as to cause the scale A on the dial to emit light. The scale A is constituted such that it is visible only when emitting light. The scale B illuminator 50 is also formed of a light emitting member such as an LED so as to cause the scale B on the dial to emit light. The scale B is also constituted such that it is visible only when emitting light.

The power source 60 is a drive power source for the MPU 10 and the LEDs or the like of the pointer illuminator 30, the scale A illuminator 40, and the scale B illuminator 50. The input interface 70 is an interface adapted to input vehicle information or a content of an operation of a user for displaying on the scales A and B. The vehicle information is data or the like relating to, for example, a speed, a rotation speed of an engine and the like, that is, information output from various well-known sensors. The content of the operation of the user is, for example, a detection signal or the like relating to switching of a scale display.

Figure 2:
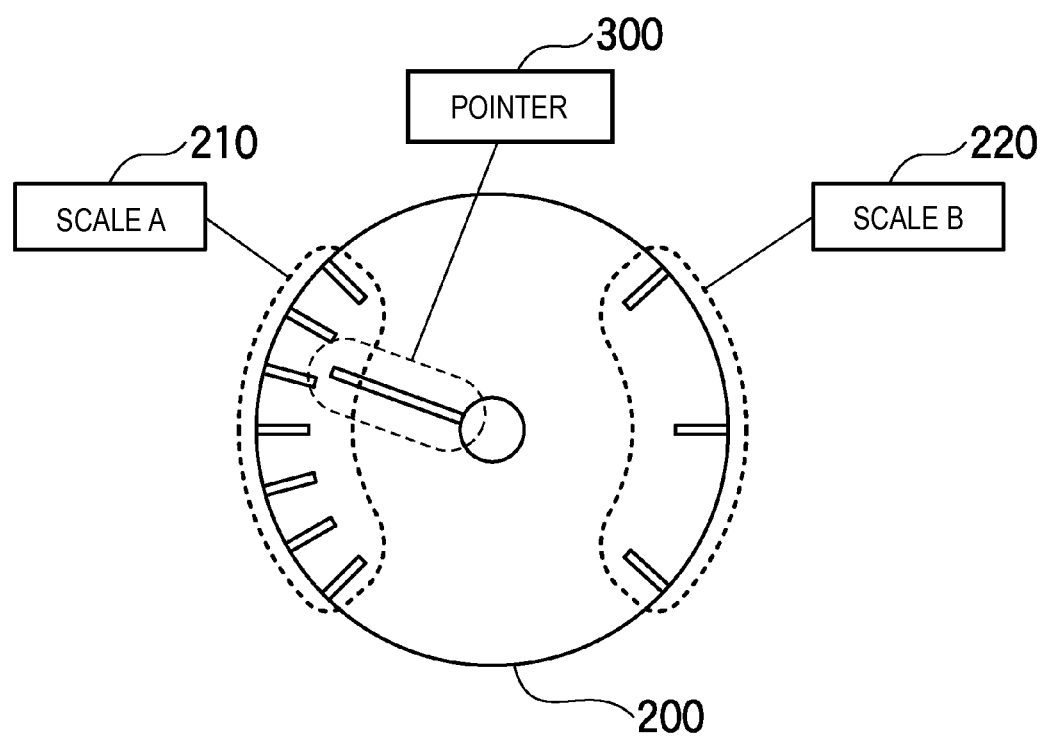
FIG. 2 is a typical view showing a rough layout of a dial according to the embodiment of the invention.

FIG. 2 is a typical view showing a rough layout of a dial according to an embodiment of the invention. A circular dial 200 is constituted in such a manner that a scale A 210 is displayed at the left side of the dial 200 and a scale B 220 is displayed at the right side of the dial 200. Meanwhile, either one of the scales emits light in an extent that can be visually observed by a driver. A pointer 300 is coupled to and rotated by the pointer drive motor 20 and indicates an adequate scale value on the scale in a light emitting state that the pointer itself emits light.

Next, a controlling operation of a switching between scales in the vehicular instrument having the above structure is described below.

Figure 3:
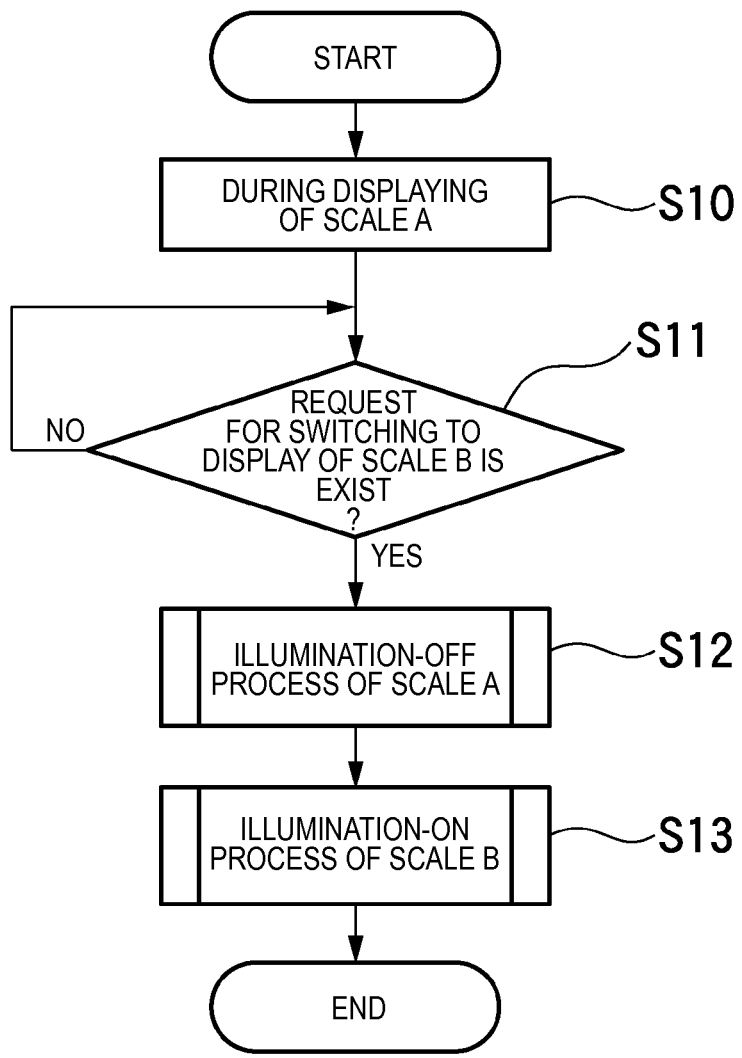
FIG. 3 is a flowchart showing a procedure of an operation of switching between scales in the vehicular instrument according to the embodiment of the invention.

FIG. 3 is a flowchart showing a procedure of an operation of the switching between the scales in the vehicular instrument according to an embodiment of the invention. First, the MPU 10 determines whether presence or absence of a request for display switching to the scale B (step S11) during the scale A is displayed (step S10). The request for display switching can be, for example, a detection signal that is input by an input operation of a driver via the input interface 70 from a switch for display switching (not shown) provided in the vicinity of a display section at a cockpit, or a control command that is generated by the MPU 10 based on a traveling state of a vehicle. For example, the control command having a content of "switching of a display is performed so as to display a speed meter when starting of traveling of a vehicle detected during the vehicle stops (idles) in a case where vehicle information relating to a rotational speed of an engine is displayed" can be previously set to the MPU 10.

When there is the request for display switching, the MPU 10 performs an illumination-off process of the scale A (step S12). Subsequently, an illumination-on process of the scale B is performed (step S13). Detailed procedures of the illumination-off process and the illumination-on process associated with the switching between the scales are specifically exemplified below by referring to the drawings.

Example 1

FIG. 4 is a typical view explanatorily showing procedures of the illumination-off process of the scale A and the illumination-on process of the scale B. In the illumination-off process, illumination of the scale A and the illumination of the pointer are simultaneously turned off so that the dial goes into a state of displaying nothing (FIGS. 4(a) to 4(b)).

Next, in the illumination-on process, the MPU 10 acquires a parameter value relating to vehicle information to be displayed in the scale B via the input interface 70 and drives the pointer drive motor 20 so as to rotate the pointer so that the pointer designates an adequate position on the scale B. After a predetermined time period has elapsed, the MPU 10 controls the pointer illuminator 30 and the scale B illuminator 50 to simultaneously emit light so that illumination of the pointer and the scale B are turned on (FIGS. 4(b) to 4(c)).

Example 2

FIG. 5 is a typical view explanatorily showing procedures of the illumination-off process of the scale A and the illumination-on process of the scale B. First, the illumination of the scale A and the illumination of the pointer are simultaneously turned off in the illumination-off process.

Next, in the illumination-on process, just after the illumination is turned off, the scale B illuminator 50 emits light so as to display only the scale B on the dial (FIGS. 6(a) to 6(b)). The MPU 10 acquires a parameter value relating to vehicle information to be displayed in the scale B via the input interface 70 and drives the pointer drive motor 20 so as to rotate the pointer so that the pointer designates an adequate position on the scale B. After that, the pointer illuminator 30 emits light so as to turn on illumination of the pointer (FIG. 5(b) to 5(c)).

Example 3

FIG. 6 is a typical view explanatorily showing procedures of the illumination-off process of the scale A and the illumination-on process of the scale B. First, the illumination of the scale A is turned off in the illumination-off process.

Next, in the illumination-on process, just after the illumination is turned off, the MPU 10 acquires a parameter value relating to vehicle information to be displayed in the scale B via the input interface 70 and drives the pointer drive motor 20 so as to rotate the pointer that is in the illumination on state, toward an adequate position on the scale B (FIGS. 6(a) to 6(b)). After the pointer is rotated to the adequate position on the scale B and a predetermined time period has elapsed from the turning-off of the illumination of the scale A, the MPU 10 controls the scale B illuminator 50 to emit light so as to turn on the illumination of the scale B (FIGS. 6(b) to 6(c)).

Example 4

Figure 7:
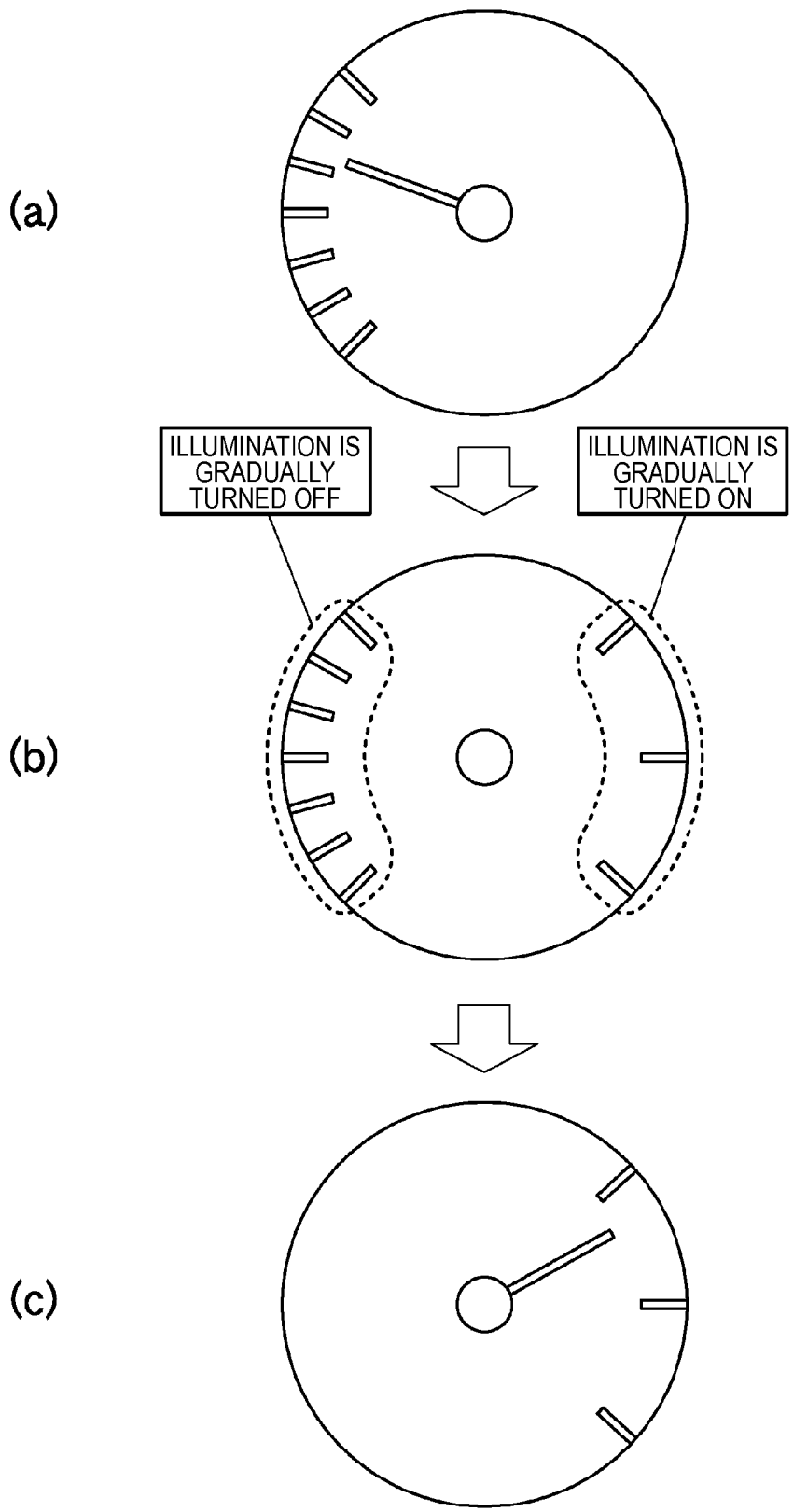
FIG. 7 is a typical view explanatorily showing procedures of an illumination-off process of a scale A and an illumination-on process of a scale B (example 4).

FIG. 7 is a typical view explanatorily showing procedures of the illumination-off process of the scale A and the illumination-on process of the scale B. In the illumination-off process, first, only the illumination of the pointer is immediately turned off, and the scale A illuminator 40 gradually lowers its luminance. After a while, the illumination of the scale A is completely turned off (FIGS. 7(a) to 7(b)).

Next, in the illumination-on process, just after the illumination of the scale A is turned off, the scale B illuminator 50 gradually increases its luminance. After a while, the illumination of the scale B is completely turned on (FIGS. 7(b) to 7(c)). The MPU 10 acquires a parameter value relating to vehicle information to be displayed in the scale B via the input interface 70, and drives the pointer drive motor 20 so as to rotate the pointer so that the pointer indicates an adequate position on the scale B. After that, the pointer illuminator 30 emits light so as to turn on the illumination of the pointer (FIGS. 7(b) to 7(c)).

Example 5

Figure 8:
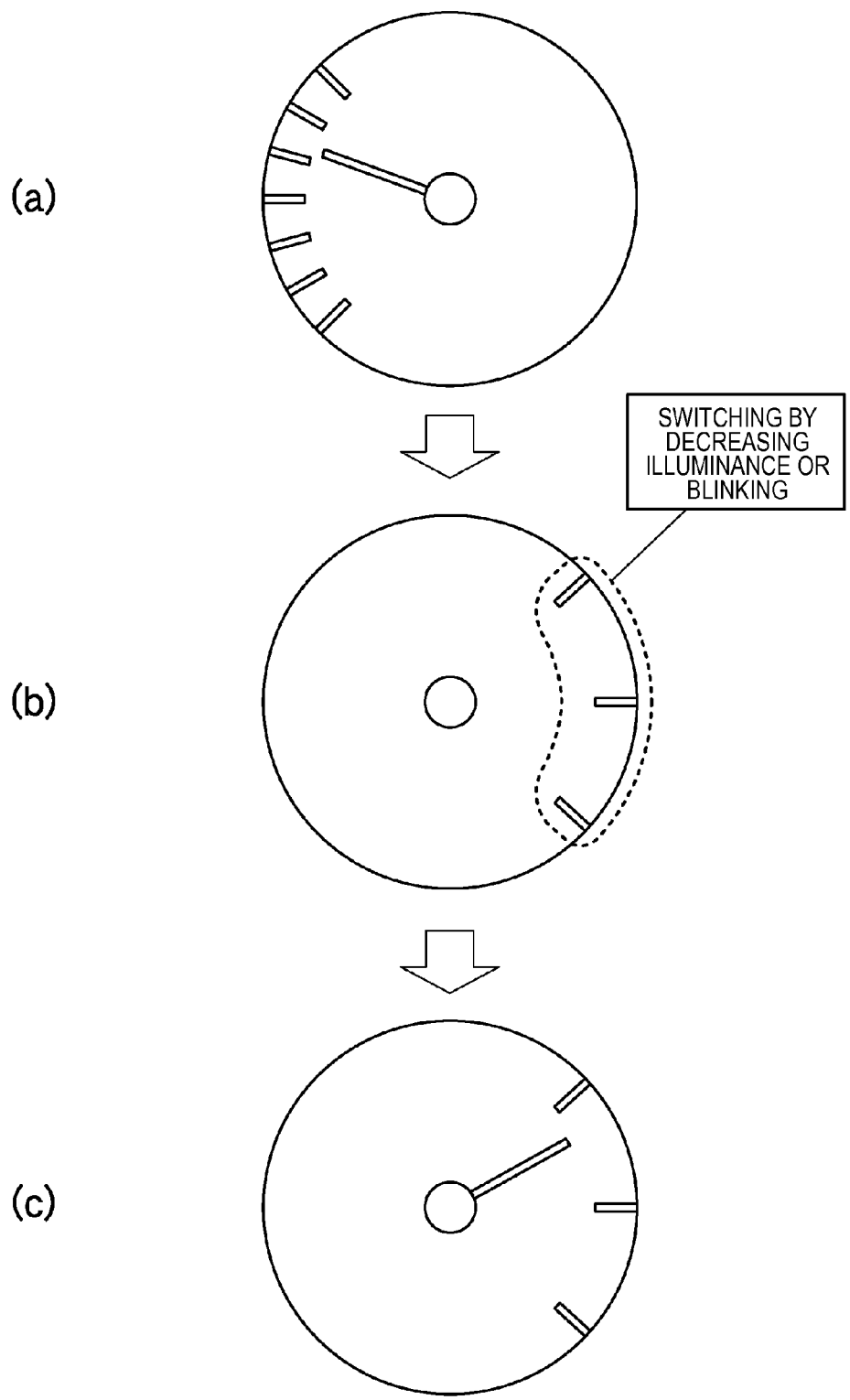
FIG. 8 is a typical view explanatorily showing procedures of an illumination-off process of a scale A and an illumination-on process of a scale B (example 5).

FIG. 8 is a typical view explanatorily showing procedures of the illumination-off process of the scale A and the illumination-on process of the scale B. First, the illumination of the pointer and the illumination of the scale A are simultaneously turned off in the illumination-off process.

Next, in the illumination-on process, just after the illuminations of the pointer and the scale A are turned off, the scale B illuminator 50 blinks so that the scale B repeats turning-on and turning-off of the illumination for a while (FIGS. 8(a) to 8(b)). The MPU 10 acquires a parameter value relating to vehicle information to be displayed in the scale B via the input interface 70, and drives the pointer drive motor 20 so as to rotate the pointer so that the pointer designates an adequate position on the scale B. After a predetermined time period has elapsed from the turning-off of the illumination of the scale A, the pointer illuminator 30 emits light so as to turn on the illumination of the pointer (FIGS. 8(b) to (c)).

Example 6

Figure 9:
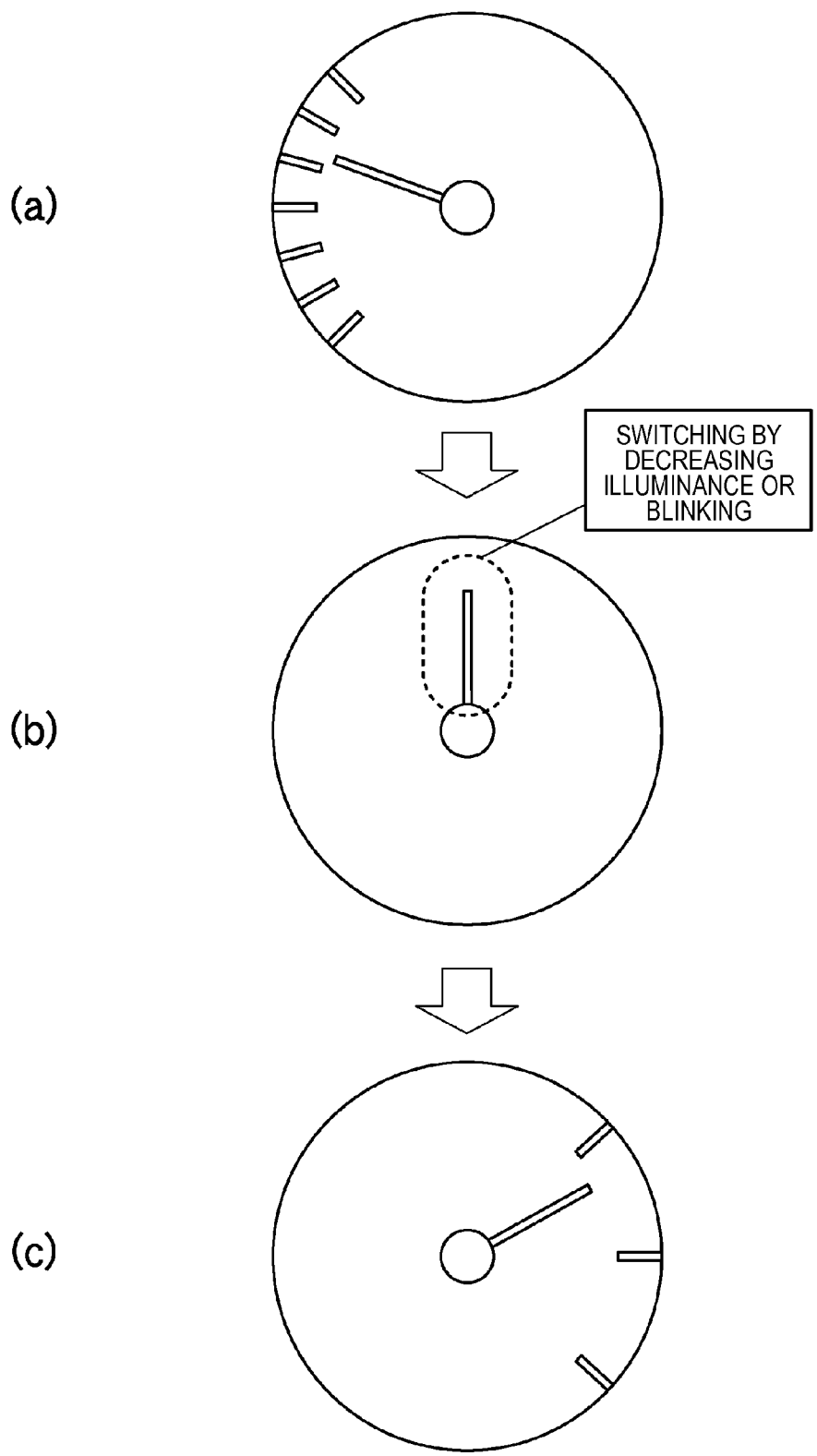
FIG. 9 is a typical view explanatorily showing procedures of an illumination-off process of a scale A and an illumination-on process of a scale B (example 6).

FIG. 9 is a typical view explanatorily showing procedures of the illumination-on process of the scale A and the illumination-off process of the scale B. First, the illumination of the scale A is turned off in the illumination-off process.

Next, in the illumination-on process, just after the illumination of the scale A is turned off, the MPU 10 acquires a parameter value relating to vehicle information to be displayed in the scale B via the input interface 70, and drives the pointer drive motor 20 so as to rotate the pointer toward an adequate position on the scale B while blinking the illumination of the pointer (FIGS. 9(a) to 9(b)). The pointer is rotated to the adequate position on the scale B. After the pointer is rotated to the adequate position on the scale B and a predetermined time period has elapsed from the turning-off of the illumination of the scale A, the scale B illuminator 50 emits light so as to turn on the illumination of the scale B (FIGS. 9(b) to 9(c)).

As described above in detail, in accordance with the controlling method for switching between the scales in the vehicular instrument of the invention, it is possible to prevent erroneous recognition and to perform highly safety displaying. In addition, since the illumination of the scale or pointer is gradually turned off or on, or blinked, it is possible to enhance the representation property of the displaying and to improve the merchantability of the vehicular instrument.

Meanwhile, in the above embodiments, the different scales are arranged at positions that are opposed with respect to a rotational center of the pointer. However, the different scales can be constituted so as to be displayed at an inner side and an outer side in an identical direction.

The controlling method for switching between the scales in the vehicular instrument has an advantage that erroneous recognition can be prevented and highly safety displaying can be performed, and the control method is useful as a control method for displaying that contributes to downsizing of the vehicular instrument.

While the invention has been described in detail with reference to the specific embodiments, it should be understood by those skilled in the art that various changes or modifications may be made without departing from the spirit and scope of the invention.

This application is based on Japanese Patent Application (JP-2008-313282) filed on Dec. 9, 2008, and the contents of which are incorporated herein by reference.

DESCRIPTION OF REFERENCE NUMERALS AND SIGNS

10 MPU
20 pointer drive motor
30 pointer illuminator
40 scale A illuminator
50 scale B illuminator
60 power source
70 input interface
100 vehicular instrument
200 dial
210 scale A
220 scale B
300 pointer

The invention claimed is:

1. A vehicular instrument, comprising:
a dial that has a display section capable of displaying a plurality of scales at a front face side thereof;
a light source that controls the display section to emit light for displaying;
a pointer that turns to indicate a value associated with an arbitrary scale on the display section; and
a light source that controls the pointer to emit light for displaying,
a controller that switches an emission of light for displaying between the plurality of the scales respectively and rotates the pointer for indicating, thereby displaying a plurality of pieces of vehicle information on the identical display section; and
wherein when a display on the dial is changed from a first vehicle information display to a second vehicle information display, emission of light for displaying a scale associated with the first vehicle information display and for illuminating the pointer are turned off, thereafter, emission of light for displaying a scale associated with the second vehicle information display is turned on, and thereafter the pointer in a non-illuminated state is rotated to a predetermined position corresponding to the scale associated with the second vehicle information display, and illumination of the pointer located at the predetermined position is turned on.

2. A vehicular instrument, comprising;
a dial that has a display section capable of displaying a plurality of scales at a front face side thereof;
a light source that controls the display section to emit light for displaying;
a pointer that turns to indicate a value associated with an arbitrary scale on the display section; and
a light source that controls the pointer to emit light for displaying,
a controller that switches an emission of light for displaying between the plurality of the scales respectively and rotates the pointer for indicating, thereby displaying a plurality of pieces of vehicle information on the identical display section; and
wherein when a display on the dial is changed from a first vehicle information display to a second vehicle information display, emission of light for displaying a scale associated with the first vehicle information display is turned off, and the pointer in an illuminated state is rotated toward a predetermined position corresponding to the scale associated with the second vehicle information display, and thereafter, emission of light for displaying a scale associated with the second vehicle information display is turned on.

3. A vehicular instrument, comprising:
a dial that has a display section capable of displaying a plurality of scales at a front face side thereof;
a light source that controls the display section to emit light for displaying;
a pointer that turns to indicate a value associated with an arbitrary scale on the display section; and
a light source that controls the pointer to emit light for displaying,
a controller that switches an emission of light for displaying between the plurality of the scales respectively and rotates the pointer for indicating, thereby displaying a plurality of pieces of vehicle information on the identical display section; and
wherein when a display on the dial is changed from a first vehicle information display to a second vehicle information display, the illumination of the pointer associated with the first vehicle information display is turned off to a non-illuminated state, thereafter, emission of light for displaying a scale associated with the first vehicle information display is gradually decreased and turned off, thereafter, emission of light for displaying a scale associated with the second vehicle information display is gradually increased thereby turning on the illumination of the scale associated with the second vehicle information display, thereafter, the pointer in the non-illuminated state is rotated to a predetermined position corresponding to the scale associated with the second vehicle information display, and thereafter, the illumination of the pointer is turned on at the predetermined position corresponding to the scale associated with the second vehicle information display.

\* \* \* \* \*